I. W. LITCHFIELD.
TOOL.
APPLICATION FILED OCT. 30, 1913.
1,207,947.
Patented Dec. 12, 1916.
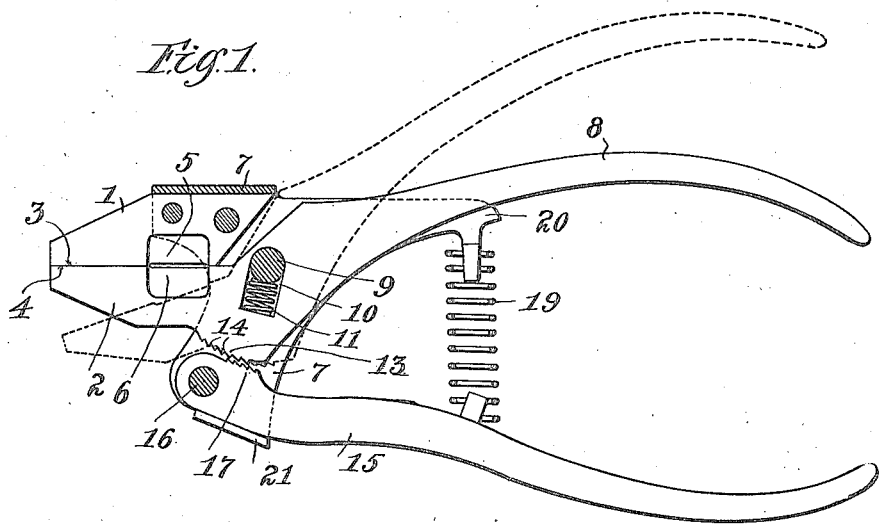
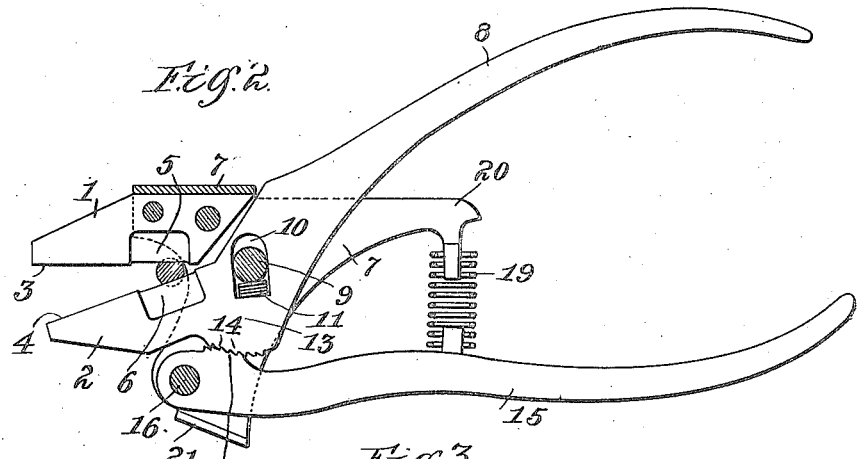
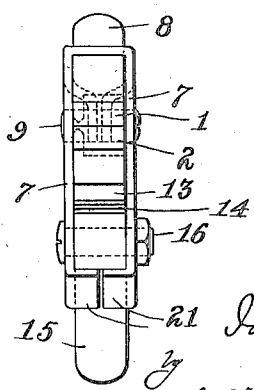
Witnesses
Wm. N. Rheem
Chauncy M. Sinerbaur
Inventor
Isaac W. Litchfield
by
Phillips Van Everen & Fish
Atty.

UNITED STATES PATENT OFFICE.

ISAAC W. LITCHFIELD, OF BOSTON, MASSACHUSETTS.

TOOL.

1,207,947.

Specification of Letters Patent. Patented Dec. 12, 1916.

Application filed October 30, 1913. Serial No. 798,216.

*To all whom it may concern:*

Be it known that I, ISAAC W. LITCHFIELD, a citizen of the United States, residing at Boston, in the county of Suffolk and State of Massachusetts, have invented certain new and useful Improvements in Tools; and I do hereby declare the following to be a full, clear, and exact description of the invention such as will enable others skilled in the art to which it appertains to make and use the same.

This invention relates to a tool of the class comprising relatively movable jaws for gripping or operating upon an object located between them and a lever or levers for relatively actuating the jaws.

The object of the invention is to produce a tool of the class referred to which may be operated with greater facility and efficiency than tools which have heretofore been devised, and to produce a tool in which the jaws are relatively actuated in an improved and novel manner.

With the above object in view, the invention consists in the devices and combinations of devices hereinafter described and particularly defined in the claims.

In the drawings illustrating the invention in the best form at present known to the inventor:—Figure 1 is a side elevation of a tool embodying the invention with a portion thereof removed to more clearly show the structure, illustrating the jaws of the tool in closed position; Fig. 2 is a side elevation similar to Fig. 1 showing the jaws of the tool in open position and an object located between the jaws; Fig. 3 is a front elevation of the tool.

It is a well known principle of mechanics that in any system of levers or other mechanical elements, the ratio of the resultant force exerted to the force applied, neglecting friction, is equal to the ratio of the distance through which the point of application of the force applied moves to the distance through which the point of application of the resultant force moves against the resistance. Therefore the greater the ratio of the distance through which the point of application of the applied force moves to the distance through which the point of application of the resultant force moves, the greater the mechanical advantage secured by the system.

In tools of this class heretofore devised, the entire closing movement of the jaws is produced by a single relative closing or contracting movement of the operating levers. In the present invention, I have devised a tool in which a single relative contracting movement of the operating levers produces only a partial closing movement of the jaws, the entire closing movement of the jaws being produced by successive relative contracting and expanding movements of the levers. By the successive contraction and expansion of the operating levers of the tool, a relative step by step movement is imparted to the jaws. Thus the ratio of the distance through which the point of application of the force applied moves to the distance through which the point of application of the resultant force moves against the resistance, and therefore the mechanical advantage secured is much greater than in the ordinary tool of this class. Furthermore, in certain operations for which a tool of this character is adapted, as, for example, the cutting or severing of an object placed between the cutting blades of the tool, it is found that the operation is performed with greater facility and efficiency by imparting a relative step by step movement to the jaws, so that a series of impulses is given to the cutting blades of the tool. In the present invention, the jaws are relatively actuated during each contracting movement of the operating levers and after such actuation, the levers may be expanded without disturbing the relative position of the jaws. Upon again contracting the operating levers, a second impulse is given to the jaws and the said jaws are advanced a second step in their movement. It is a well known fact that in operating a tool of this character the operator is able to secure a more effective grip upon the operating levers and to apply greater pressure thereupon when the levers are separated to a considerable extent than when the levers are brought close together. In tools which have been heretofore constructed, the extent of separation of the levers diminishes as the jaws close so that the effectiveness of the grip of the hand on the handles is diminished. An important advantage secured by a tool operating as described, consists in the fact that when the operating levers of the tool have been contracted to actuate the jaws the said levers may again be expanded to substantially the same relative position as before to enable the operator to secure a more effective grip without disturbing the relative position of the jaws. Upon again contracting the operating levers, a further relative movement is imparted to the jaws. The mechanism by which, in the illustrated embodiment of the invention, the above, and other advantages are secured will now be described.

In the construction illustrated, the relatively movable jaws of the tool are indicated at 1 and 2. These jaws are provided with opposed gripping faces 3 and 4 and with opposed cutting blades 5 and 6 constructed and arranged in the usual manner. The jaw 1 of the tool is mounted in fixed position in a sheet metal frame 7 bent in a form substantially O-shaped in cross section and embracing the said jaw. The jaw 2 of the tool is preferably arranged for pivotal movement with relation to the jaw 1 and to this end is carried by and formed integral with a lever 8 pivotally mounted between the sides of the frame 7 upon a pivot bolt or pin 9 passing through a slot 10 in the lever 8, the purpose of which slot will be hereinafter explained. A coil spring 11 interposed between the pivot pin or bolt 9 and the outer extremity of the slot 10 normally maintains the said pivot bolt in contact with the inner extremity of the slot. A sector 13 is formed on the lever 8, the arc of which is substantially concentric with the inner end of the slot 10, the said slot extending radially of the sector. The said sector is formed with a series of rearwardly inclined teeth 14. A lever 15 is pivoted between the sides of the frame 7 upon a pivot bolt or pin 16 and is provided with a toothed portion 17, the forwardly inclined teeth of which are arranged to engage the teeth of the sector 14, as shown in Fig. 2, at a point to the rear of the line connecting the axes of the pivot bolts 9 and 16 so that when the lever 15 is actuated the said toothed portion 17 acts as a cam on the said sector. A coil spring 19 is interposed between a rearwardly extending arm 20 of the frame 7 and the lever 15 and operates to hold the said lever normally in the position shown in Fig. 1 in engagement with the inwardly extending shoulders 21 on the frame 7.

When there is no resistance introduced between the jaws of the tool to impede the free relative movement of the jaws, the lever 15 is maintained in the position shown in Fig. 1 by the coil spring 19 so that the teeth of the portion 17 of the lever 15 clear the teeth of the segment 13 and the jaw 2 may be moved freely about the pivot bolt 9 to open and close the jaws. Therefore in gripping or otherwise operating upon an object, the jaws may be quickly adjusted to bring them into engagement with the object. When the object is located between the jaws of the tool and the jaws are closed thereon, the resistance of the object prevents further relative contracting movement of the jaws, and the pressure applied to the levers causes the lever 15 to swing on its pivot bringing the toothed portion of said lever into engagement with the teeth of the segment 13. This operation takes place only upon the introduction of a resistance between the jaws and is independent of the position of the jaw 2 relative to the other jaw. When further pressure is applied to the operating levers 8 and 15, the toothed portion 17 of the lever 15 acting on the sector 13 tends to produce a rotary movement of the lever 8 about the pivot 9 and a movement of the lever along said pivot in the direction of the slot 10, thereby causing the object to be securely gripped between the gripping faces of the jaws. The toothed portion of the lever 8 is located in proximity to the pivot of said lever so that the ratio of the resultant force exerted by the lever 8 to the pressure applied to the operating levers of the tool is very high, and a very effective gripping action is secured. In the cutting operation, the article to be severed is placed between the cutting blades of the jaws, the blades are closed thereon, and the operating levers are gripped and actuated to throw the toothed portion 17 of the lever 15 into engagement with the teeth of the sector 13, as in the gripping operation. When further pressure is now applied to the operating levers, the action of the toothed portion 17 of the lever 15 on the sector 13 tends to produce a rotary movement of the lever 8 about the pivot 9 and a movement of said lever along the said pivot, as before. As the levers are contracted, the cutting blades bite into the object in this operation and the lever 8 moves along the pivot 9 shifting said pivot toward the outer end of the slot 10 and compressing the coil spring 11 between the pivot and the end of said slot, the parts assuming substantially the positions shown in Fig. 2. In the construction described the coöperating portions of the levers 8 and 15 constitute a toggle acting to force the jaws of the tool together, the central point of the toggle being the point of engagement of the toothed portion 17 of the lever 15 with the sector 13. In this single contracting movement of the operating levers of the tool, the relative movement of the jaws is slight as compared with the movement of the jaws of a tool of the ordinary type produced by a corresponding movement of the operating levers. The mechanical advantage secured is therefore much greater than in the ordinary tool.

When the grip or pressure of the hand upon the operating levers of the tool is released, the lever 15 under the action of the coil spring 19 moves outwardly, the teeth of the portion 17 sliding over the teeth of the segment 13. At the same time the coil spring 10 acting against the pivot 9 and the outer end of the slot 10 moves the lever 8 radially of the sector 13 restoring the pivot 9 to the inner extremity of the slot so that the arc of the sector 13 is substantially at the same distance from the axis of the lever 15 as in the initial operation. When the operating levers are again gripped by the operator, the toothed portion of the lever 17 is again brought into engagement with the teeth of the sector 13 to actuate the lever 8. During the initial operation, however, the lever 8 has been moved angularly about the pivot 9 to advance the sector 13 with respect to the portion 17 of the lever 15 so that upon the second engagement of the said portion with the teeth of the sector, the said portion engages the sector one or more teeth to the rear of its previous point of engagement and the operating levers are separated or expanded to substantially the same extent as in the initial operation, enabling the operator to obtain an effective grip thereon. It is to be noted also that the position of the point of engagement of the toothed portion of the lever 15 with relation to the axis of said lever and to the pivot 9 is substantially the same as in the initial operation. Therefore the same mechanical advantage is secured for each contracting movement of the levers. Upon a second contraction of the operating levers, the jaws are relatively actuated to bite further into the object to be severed in the same manner as in the initial operation. By the repeated gripping and releasing of the operating levers of the tool and the consequent contraction and expansion of said levers, a step by step movement is imparted to the jaws of the tool until the object is severed, the levers being restored to their initial expanded position to enable the operator to obtain a better grip thereon upon each release of pressure. In the entire closing movement of the jaws, the operating levers are repeatedly moved from expanded to contracted position. Therefore the distance through which the point of application of the force applied to each of the operating levers moves during the same relative movement of the jaws and therefore the mechanical advantage secured is much greater in the tool of the present invention than in tools of this class which have heretofore been devised.

Although the invention has been illustrated and described as applied to a tool provided with a pair of operating levers for actuating the jaws, certain features thereof may be applied to other tools comprising relatively movable jaws, as, for example, tools in which one of the jaws is fixed and a single operating lever is provided for actuating the movable jaw.

Having explained the nature and object of the invention and having specifically described one embodiment thereof, what is claimed is:—

1. A tool of the class described, having, in combination, relatively movable jaws, levers for actuating the jaws, one of which is movable relatively to both the jaws, connections for moving said jaws respectively as one with the levers to open and close the jaws, and means to produce relative working movement of the jaws by the movement of one of said levers relatively to the jaws.

2. A tool of the class described, having, in combination, relatively movable jaws, levers for actuating the jaws, one of which is movable relatively to both the jaws, connections for moving said jaws respectively as one with the levers to open and close the jaws, and means to produce relative working movement of the jaws by the movement of one of said levers relatively to the jaws, said means being effective only upon the introduction of a resistance between the jaws.

3. A tool of the class described, having, in combination, relatively movable jaws, a lever for relatively actuating the jaws arranged to move relatively to both the jaws, a connection for causing one of said jaws to move as one with the lever to open and close the jaws, and means to produce relative working movement of the jaws by the movement of the lever relative to the jaws.

4. A tool of the class described, having, in combination, relatively movable jaws, a lever for relatively actuating the jaws arranged to move relatively to the jaws, a connection for causing one of said jaws to move as one with the lever to open and close the jaws, and means to produce relative working movement of the jaws by the movement of the lever relatively to the jaws, said means being effective only upon the introduction of a resistance between the jaws.

5. A tool of the class described, having, in combination, relatively movable jaws, a lever for relatively moving the jaws movable with relation to both the jaws, means for causing one of the jaws to move as one with the lever to open and close the jaws, and means comprising a toggle connection operated by the movement of said lever relatively to both jaws for imparting a relative working movement to the jaws.

6. A tool of the class described, having, in combination, relatively movable jaws, levers for actuating the jaws, one of which is movable with relation to both the jaws, connections for causing the jaws to move respectively as one with the levers to open and close the jaws, and means for imparting a relative step-by-step working movement to the jaws by relative reciprocating movements of the levers.

7. A tool of the class described, having, in combination, relatively movable jaws, a lever for relatively actuating the jaws movable with relation to both the jaws; a connection for causing one of the jaws to move as one with the lever to open and close the jaws, and means for imparting a relative step-by-step movement to the jaws by reciprocating movements of the lever relative to the jaws.

8. A tool of the class described, having, in combination, relatively movable jaws, a lever for relatively actuating the jaws movable with relation to both the jaws, a connection for causing one of the jaws to move as one with the lever to open and close the jaws, and means for imparting a relative step-by-step movement to the jaws by reciprocating movements of the lever relative to the jaws, said means being effective only upon the introduction of a resistance between the jaws.

9. A tool of the class described, having, in combination, a jaw, a frame upon which said jaw is mounted, a second jaw, a combined sliding and pivotal connection between the jaws, a lever pivoted to the frame, and connections actuated by the pivotal movement of the lever on its pivotal connection with the frame for causing the second jaw to slide and swing toward the first jaw.

10. A tool of the class described, having, in combination, a jaw, a frame upon which said jaw is mounted, a second jaw pivotally connected with the first jaw, a lever pivoted to the frame and arranged to act on the second jaw, connections for causing the first jaw to move as one with the lever to open and close the jaws, and means for imparting a relative working movement to the jaws by the pivotal movements of the lever on its pivotal connection with the frame.

11. A tool of the class described, having, in combination, a jaw, a frame upon which said jaw is mounted, a second jaw pivotally connected with the first jaw, a lever pivoted to the frame, and intermeshing ratchet teeth carried by the second jaw and the lever for imparting a relative step-by-step movement to the jaws by the reciprocating movements of the lever on its pivotal connection with the frame.

12. A tool of the class described, having, in combination, a jaw, a frame upon which said jaw is mounted, a second jaw, a combined sliding and pivotal connection between the jaws, a lever pivoted to the frame, and intermeshing teeth carried by the second jaw and the lever arranged to cause the second jaw to slide and swing toward the first jaw as the lever is swung upon its pivotal connection with the frame.

ISAAC W. LITCHFIELD.

Witnesses:
  M. A. Hurley,
  N. D. McPhail.